(12) United States Patent
Zlotnik et al.

(10) Patent No.: US 12,737,030 B2
(45) Date of Patent: Sep. 15, 2026

(54) CURRENT AND CLOCK FREQUENCY MANAGEMENT

(71) Applicant: Micron Technology, Inc., Boise, ID (US)

(72) Inventors: Leon Zlotnik, Camino, CA (US); Leonid Minz, Beer Sheva (IL); Ekram H. Bhuiyan, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 76 days.

(21) Appl. No.: 18/789,278

(22) Filed: Jul. 30, 2024

(65) Prior Publication Data

US 2025/0105829 A1 Mar. 27, 2025

Related U.S. Application Data

(60) Provisional application No. 63/584,733, filed on Sep. 22, 2023.

(51) Int. Cl.
*G06F 1/324* (2019.01)
*G05F 1/56* (2006.01)

(52) U.S. Cl.
CPC ................ *G06F 1/324* (2013.01); *G05F 1/56* (2013.01)

(58) Field of Classification Search
None
See application file for complete search history.

(56) References Cited

U.S. PATENT DOCUMENTS 7,605,575 B2 * 10/2009 Leutgeb .................. G05F 1/573 323/285
7,746,057 B2 * 6/2010 Melanson .......... G01R 21/1331 324/120
8,289,009 B1 * 10/2012 Strik ....................... G05F 1/575 323/280
10,139,888 B2 * 11/2018 Ihs ........................ G06F 1/3296
10,446,198 B2 10/2019 Hasbun et al.
10,490,245 B2 11/2019 Hasbun et al.
10,725,913 B2 7/2020 Hasbun et al.
10,852,737 B2 12/2020 Szubbocsev

* cited by examiner

*Primary Examiner* — Thomas J. Hiltunen
(74) *Attorney, Agent, or Firm* — Brooks, Cameron & Huebsch, PLLC

(57) ABSTRACT

Current sensing circuitry and clock management circuitry provide current and clock frequency management. In one example, an apparatus can include a voltage regulator, current sensing circuitry configured to: detect a current associated with the voltage regulator of a system-on-chip (SoC), and determine when the current transitions from a first current to a second current; and clock management circuitry configured to: generate clocking signals for the SoC, select a gradient frequency alteration based on the detected current, and alter a frequency of the generated clocking signals to the gradient frequency alteration in response to the detected current transition.

20 Claims, 4 Drawing Sheets

CURRENT AND CLOCK FREQUENCY MANAGEMENT

PRIORITY INFORMATION

This Application claims the benefit of U.S. Provisional Application No. 63/584,733, filed on Sep. 22, 2023, the contents of which are incorporated herein by reference.

BACKGROUND

A memory system can include one or more digital circuits that can include various circuitry. In general, a portion of the circuitry can provide a voltage signal to power the digital circuits and/or to power components of the memory system.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
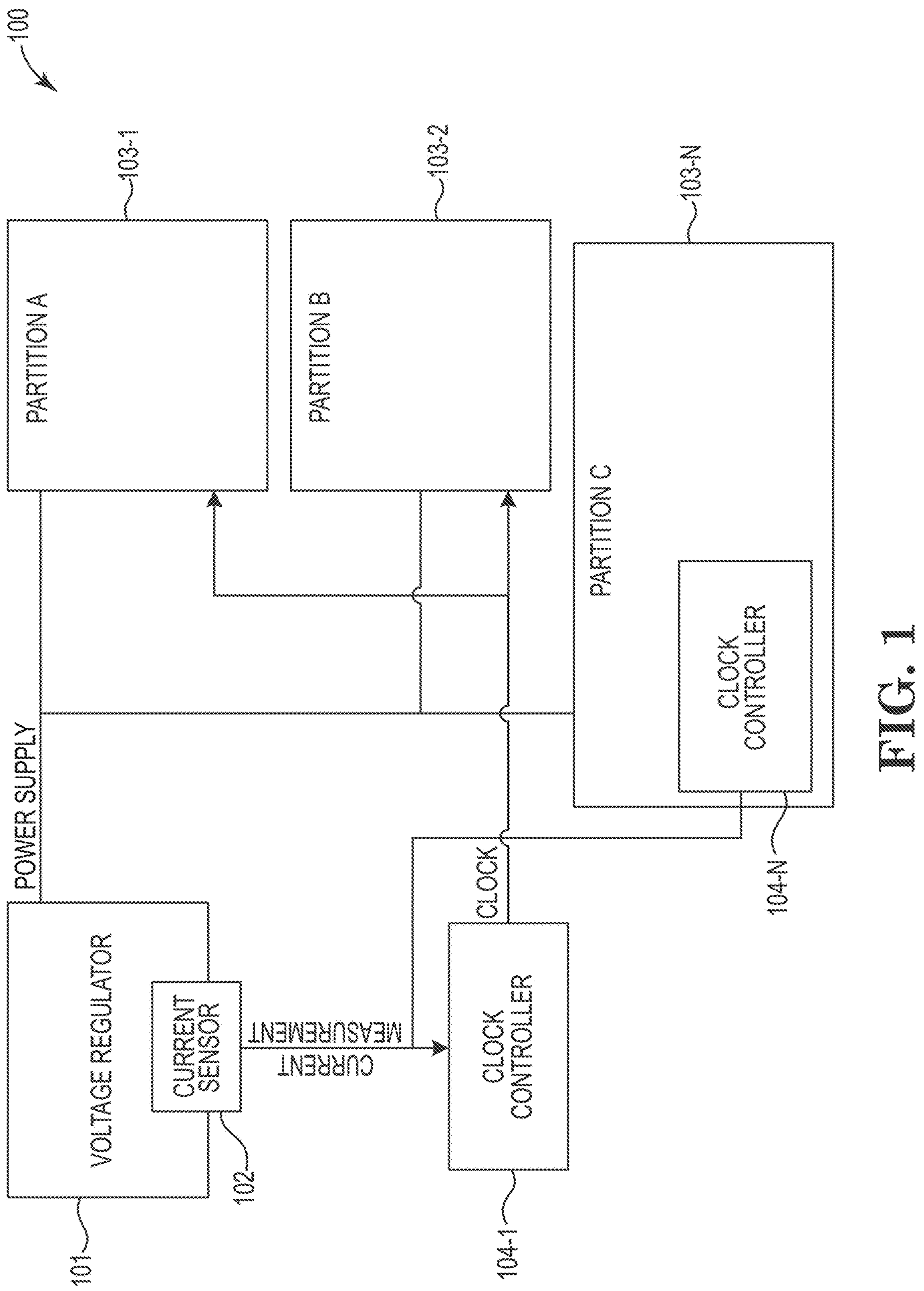
FIG. 1 illustrates an example system including current sensing circuits for current and clock frequency management in accordance with some embodiments of the present disclosure.

Aspects of the present disclosure are directed to current and clock frequency management. Current and clock frequency management can be achieved through the use of a current sensing circuit that can determine an current (e.g., an instantaneous or near-instantaneous current) associated with a system (e.g., a System-on-Chip (SoC), application-specific integrated circuit (ASIC), field-programmable gate array (FPGA), or other hardware circuitry) and clock management circuitry to reduce power consumption and/or to improve performance in the system in comparison to approaches that do not employ such management. The current sensing circuit(s), in concert with the clock management circuitry described herein can provide benefits in systems that rely on instantaneous (or near-instantaneous) current sensing to track, limit, adjust, and/or manipulate power consumption and/or noise dynamically. Examples of apparatuses and systems that employ current and clock frequency management in accordance with embodiments of the present disclosure are described below in conjunction with FIG. 1, et alibi.

The current and clock frequency management systems and devices described herein can dynamically and automatically adjust generated clocking signals during power mode transitions based on the detected current. A current sensing circuit can be utilized to detect instantaneous or near instantaneous current readings associated with a system and provide the detected current to clock management circuitry. The clock management circuitry can generate clocking signals for the system in response to the detected current. In this way, the present disclosure provides less power mode transition latency compared to previous systems and approaches. In addition, the present disclosure allows for power mode transition terminations without performance interruptions. Furthermore, the present disclosure is able to dynamically and automatically adjust to IR drops and/or other types of current irregularities while still compensating for temperature and voltage fluctuations. These and other aspects of the present disclosure can also provide for a reduction in power consumption in various types of systems, computing devices, and/or circuits; thereby providing an improvement to computing devices in which aspects of the present disclosure are deployed.

Through utilization of the current sensing circuit(s) and/or clock management circuitry described herein, current and clock frequency management can be provided to a system and/or components coupled to the system. For example, current sensing circuitry can be deployed in a system (e.g., a SoC, ASIC, FPGA, etc.) to detect current characteristics (e.g., a current drop or "IR drop", current increase, etc.) in locations within the system that may be prone to exhibiting IR drop phenomena. As described in more detail herein, responsive to the current characteristics being determined by the current sensing circuits, the clock management circuitry can alter the frequency of the generated clocking signals for the system. In this way, the frequency of the clocking signals can be locked to correspond with threshold current values determined by the current sensing circuits. Thus, the clock management circuitry can provide a corresponding frequency of clocking signals of a clock gradient associated with the detected current of the system.

FIG. 1 illustrates an example system 100 including current sensing circuits (e.g., current sensor 102, etc.) in accordance with some embodiments of the present disclosure. The example system 100, which can be referred to in the alternative as an "apparatus," includes a voltage regulator 101 that is configured to generate and apply a power supply signal (e.g., a supply voltage signal) to the components of the system 100. As used herein, a voltage regulator 101 can be a device or system of devices that can manipulate or alter an output voltage. For example, the voltage regulator 101 can include one or more of: a power supply, one or more converters, one or more inverters, one or more generators, among other electrical components that can alter a voltage or current. In another example, the voltage regulator 101 can include batteries or solar elements with a switch that connects different battery elements to manipulate the voltage.

The system 100 is couplable to one or more computing components. The computing components are generally external to the system 100 (i.e., the computing components are physically distinct from a chip, such a SoC that the system 100 is deployed on) but are communicatively couplable to the system 100 such that signaling can be exchanged between the system 100 and the computing components. Non-limiting examples of the computing components can include controllers, memory devices, graphics processing units, processors/co-processors, and/or logic blocks, among others that are connected to a computer in which the system 100 operates.

In some embodiments, the current sensor 102 can be a current mirror sensor, a current transformer, and/or other type of current sensor capable of instantaneous or near instantaneous current measurements. The current sensor 102 can be a current mirror sensor resident on the voltage regulator 101. As used herein, a current mirror sensor can be a type of sensor that is used to detect a current level flowing within a circuit. In some embodiments, the current mirror sensor can be a configuration of transistors that replicate or mirror the current flowing through one transistor to another transistor. In some embodiments, the current mirror sensor can include a reference current source and a sensing transistor. The reference current source can be a stable or well controlled current source that can provide a known or constant current. The sensing transistor can be coupled in line or in a path of a current to be measured or detected. In some embodiments, the reference current from the current source is mirrored onto the sensing transistor. This is achieved by adjusting a biasing and a sizing of the sensing transistor in such a way that it replicates the current flowing through the reference current source. By monitoring the characteristics of the sensing transistor, such as its voltage or output current, you can deduce the current flowing through the circuit. Variations or discrepancies between the sensing transistor's behavior and the reference current source's behavior can be used to determine the current being measured.

In some embodiments, the current sensor 102 can be a current transformer sensor coupled to a switching supply. As used herein, a current transformer (CT) can refer to a type of current sensor used to measure the alternating current (AC) flowing through a conductor without the need to directly connect to it. In some embodiments, a current transformer operates on the principle of electromagnetic induction. When an alternating current flows through the primary winding (the conductor being measured), it generates a magnetic field around the conductor. The core of the current transformer is typically made of a magnetic material. Wrapped around this core is the secondary winding, which consists of many turns of wire. The secondary winding is designed to have a large number of turns compared to the primary winding. This ratio between the primary and secondary windings determines the transformation ratio of the current transformer. By knowing the transformation ratio of the current transformer, a secondary voltage can be used to determine the primary current. The measurement device connected to the secondary winding can then process this voltage to provide an accurate representation of the primary current.

As shown in FIG. 1, the current sensor 102 can issue signaling indicative of a current level to a first clock controller 104-1 and/or a second clock controller 104-2 (e.g., clock management circuitry, etc.). Although a first clock controller 104-1 and a second clock controller 104-2 are illustrated, more or fewer clock controllers can be utilized. For example, the system 100 can utilize one of the first clock controller 104-1 or the second clock controller 104-2. In other embodiments, a clock controller can be resident on a partition A 103-1, a partition B 103-2, and/or partition C 103-N.

The system 100 can include clock controllers 104-1, 104-2 that include clock management circuitry. The clock controllers 104-1, 104-2 or clock management circuitry can be configured to generate and apply clocking signals to various components of the system 100, such as partition A 103-1, partition B 103-2, partition C 103-N and/or additional partitions not illustrated. In some embodiments, partition A 103-1 can be a first logic block and partition B 103-2 can be a second logic block that is separate from the first logic block. Embodiments are not so limited, however, and the clock controllers 104-1, 104-2 or clock management circuitry can generate and apply clocking signals to components external to the system 100, as described in more detail herein. Advantageously, the clock controllers 104-1, 104-2 can be configured to alter a frequency of the clock signals generated thereby, as will be described in more detail below.

The partition A 103-1, partition B 103-2, and/or partition C 103-N can include various hardware that form one or more cores (e.g., "intellectual property (IP) cores"). As used herein, a "core" or "IP core" generally refers to one or more blocks of data and/or logic that form constituent components of an application-specific integrated circuit or field-programmable gate array. The partition A 103-1, partition B 103-2, and/or partition C 103-N can be designed, built, and/or otherwise configured to perform specific tasks and/or functions within the systems described herein. In some embodiments, the current sensor 102 can take an action (or cause an action to be taken) to track, limit, adjust or manipulate the dynamic power available to the partition A 105-1 and/or the partition B 105-N.

The clock controllers 104-1, 104-2 can include hardware circuitry configured to perform the operations described herein. For example, the clock controllers 104-1, 104-2 can include one or more chips or other hardware circuitry that is configured to generate periodically oscillating signals (e.g., square waves) that are applied to components of the system 100. In some embodiments, the clock controllers 104-1, 104-2 includes throttling circuitry, clock division circuitry, and/or a voltage-controlled oscillator to facilitate embodiments of the present disclosure.

In some embodiments, at least one of the clock controllers 104-1, 104-2 and/or current sensor 102 can be resident on one of the partitions (partition A 103-1, partition B 103-2, as illustrated on partition C 103-N etc.). As used herein, the term "resident on" refers to something that is physically located on a particular component. For example, the current sensor 102 and/or the clock controller 104-2 being "resident on" the partition C 103-N refers to a condition in which the hardware circuitry that comprises the current sensor 102 and/or the clock controller 104-N is physically located on the partition C 103-N. The term "resident on" may be used interchangeably with other terms such as "deployed on" or "located on," herein.

In a non-limiting example, the system 100 can include a current sensor 102 can be configured to detect a current associated with a system-on-chip (SoC) and determine when the current transitions from a first current to a second current. The current can be generated by the voltage regulator 101 and/or associated with one or more components of the system 100. In some embodiments, the current transition can correspond to a particular current change (e.g., a current decrease, current increase) which the SoC is consuming. In some embodiments, the current change can correspond to a change from an idle current to a full current or a change from an idle mode to a normal or full mode. As used herein, a full current refers to a designated or specified current level at which an electrical component, device, or system is designed to operate. It can serve as a standard reference point that manufacturers and engineers use to design, build, and operate various electrical and electronic equipment. In this way, the system 100 can be operating in a normal mode or operating mode when the full current is detected by the current sensor 102. As used herein, an idle current can refer to a minimum current for retention of data associated with the system 100. In this way, the idle current can refer to a current provided by the voltage regulator 101 during a sleep mode or low power mode of the system 100. In these embodiments, the full current can be greater than the idle current. In this way, the current transition from the first current to the second current can include a current transition of the SoC from an idle state to an active state or from an activate state to an idle state.

As described herein, the system 100 further includes clock controllers 104-1, 104-2 (collectively referred to as clock controller 104) that can be configured to generate clocking signals for the SoC. The clock controller 104 can be configured to select a gradient frequency alteration based on the current. In these embodiments, clock controller 104 can be configured to alter a frequency of the generated clocking signals to the gradient frequency alteration in response to the detected current transition. In some embodiments, the frequency of the generated clocking signals is altered to correspond with the value of the detected current. In some embodiments, the gradient frequency includes a specific clock frequency to be utilized during a specific range of current values.

In some embodiments, the clock controller 104 can detect a transient current at the voltage regulator 101. In some embodiments, the voltage regulator 101 is a Low Dropout Regulator (LDO). In some embodiments, the voltage regulator 101 includes a voltage sense feedback to compensate a current-resistance drop.

In this way, the clock controller 104 can receive a particular current value from the current sensor 102 and generate a frequency of clocking signals corresponding to the gradient frequency alteration associated with the particular current value. In some embodiments, the clock controller 104 can lock the frequency of the clocking signals to the detected current such that an increase in the detected current results in an increase in the frequency of the clocking signals and a decrease in the detected current results in a decrease in the frequency of the clocking signals.

In some embodiments, the clock controller 104 can be configured to alter the frequency of the clocking signals by decreasing the frequency of the clocking signals according to the gradient frequency alteration. The frequency of clocking signals can be referred to as the clock frequency or clock speed. The frequency of the clocking signals is a parameter in digital systems and electronics. The frequency of clocking signals can represent the rate at which a clock signal alternates between its high and low states (or transitions between 1 and 0) within a specific time interval. Clocking signals can be utilized to synchronize various components and operations within a digital circuit, ensuring that actions occur at precise and coordinated times. Clock frequency can be measured in hertz (Hz) and represents the number of clock cycles that occur per second. A higher clock frequency generally indicates faster processing capabilities and more rapid data transfer within a digital system.

In some embodiments, the clock controller 104 can be configured to alter the frequency of the clocking signals by increasing the frequency of the clocking signals according to the gradient frequency alteration. As described further herein, the gradient frequency alteration can be a gradient frequency threshold that includes a designated frequency for a range of current values. That is, a first gradient frequency alteration include a particular frequency of clocking signals to be generated when the detected current level is within a threshold range of current levels. In this way, the frequency of the clocking signals are not altered during relatively minor alterations in the detected current. That is, the frequency of the clocking signals are altered to a different gradient frequency alteration when the detected current exceeds or falls below a current threshold associated with a current gradient frequency alteration.

In some embodiments, the clock controller 104 can be configured to alter the frequency of the generated clocking signals in the absence of a clock management timing component. As used herein, clock management timing component refers to hardware or software that controls the timing or frequency of the clock to synchronize the clock to a plurality of features of the system. Since the clock is fixed to one of the plurality of gradient frequency alterations based on a detected current, additional hardware and/or software may not be needed. A power mode transition termination can include a termination signal that stops a transition from a first power mode to a second power mode during the transition period. For example, a transition can occur from an idle mode to an operation mode. A power mode early termination can prevent the system from transitioning from the idle mode to the operation mode such that the system returns to the idle mode prior to reaching the operation mode. Since the detected current does not reach the full current associated with the operation mode, the clocking signals do not reach the full operation mode frequency. In this way, the frequency of the clocking signals can increase between the idle current and a termination signal. When the termination signal is received, the detected current and the frequency of the clocking signals can decrease back to the current and frequency of clocking signals associated with the idle mode.

In some embodiments, the clock controller 104 can be configured to apply a power mode transition termination during a power mode transition. In some embodiments, the clock controller 104 can be configured to apply the clocking signals having the altered frequency to one or more of the plurality of computing components or to one or more components of the SoC. As described herein, the clocking signals can be provided to a plurality of components that are not associated with the SoC and a plurality of components that are associated with the SoC. In this way, the components of the SoC and the plurality of computing components can be synchronized by the clocking signals provided by the clock controller 104.

In some embodiments, the current sensing circuits of the current sensor 102 can be deployed on, or otherwise included in a memory system (e.g., a storage device, a memory module, or a hybrid of a storage device and memory module). Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

In other embodiments, the current sensing circuits of the current sensor 102 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Such computing devices can include a host system that is coupled to a memory system (e.g., one or more storage devices, memory modules, or a hybrid of a storage device and memory module). A host system can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system uses the storage device, the memory module, or a hybrid of the storage device and the memory module, for example, to write data to the storage device, the memory module, or the hybrid of a storage device and memory module and read data from the storage device, the memory module, or the hybrid of a storage device and memory module.

In these examples, the host system can include a processing unit such as a central processing unit (CPU) that is configured to execute an operating system. In some embodiments, the processing unit can execute a complex instruction set computer architecture, such an x86 or other architecture suitable for use as a CPU for a host system.

A host system can be coupled to a memory system via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system and the memory system. The host system can further utilize an NVM Express (NVMe) interface to access components when the memory system is coupled with the host system by the PCIe interface. The physical host interface can provide an interface for passing control, address, data, and other signals between the memory system and the host system. In general, the host system can access multiple memory sub-systems via a same communication connection, multiple separate communication connections, and/or a combination of communication connections.

A memory system can include any combination of the different types of non-volatile memory devices and/or volatile memory devices. The volatile memory devices can be, but are not limited to, random access memory (RAM), such as dynamic random-access memory (DRAM) and synchronous dynamic random access memory (SDRAM).

Some examples of non-volatile memory devices include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory components such as three-dimensional cross-point arrays of non-volatile memory cells and NAND type memory (e.g., 2D NAND, 3D NAND) are described, the memory device can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory system can also include additional circuitry or components. In some embodiments, a memory system can include a cache or buffer (e.g., DRAM) and address circuitry (e.g., a row decoder and a column decoder) that can receive an address from the memory system controller and decode the address to access the memory device(s).

In some embodiments, memory devices can include local media controllers that operate in conjunction with a memory system controller to execute operations on one or more memory cells of the memory devices. For example, an external controller can externally manage the memory device (e.g., perform media management operations on the memory device). In some embodiments, a memory device is a managed memory device, which is a raw memory device combined with a local controller for media management within the same memory device package. An example of a managed memory device is a managed NAND (MNAND) device.

Figure 2:
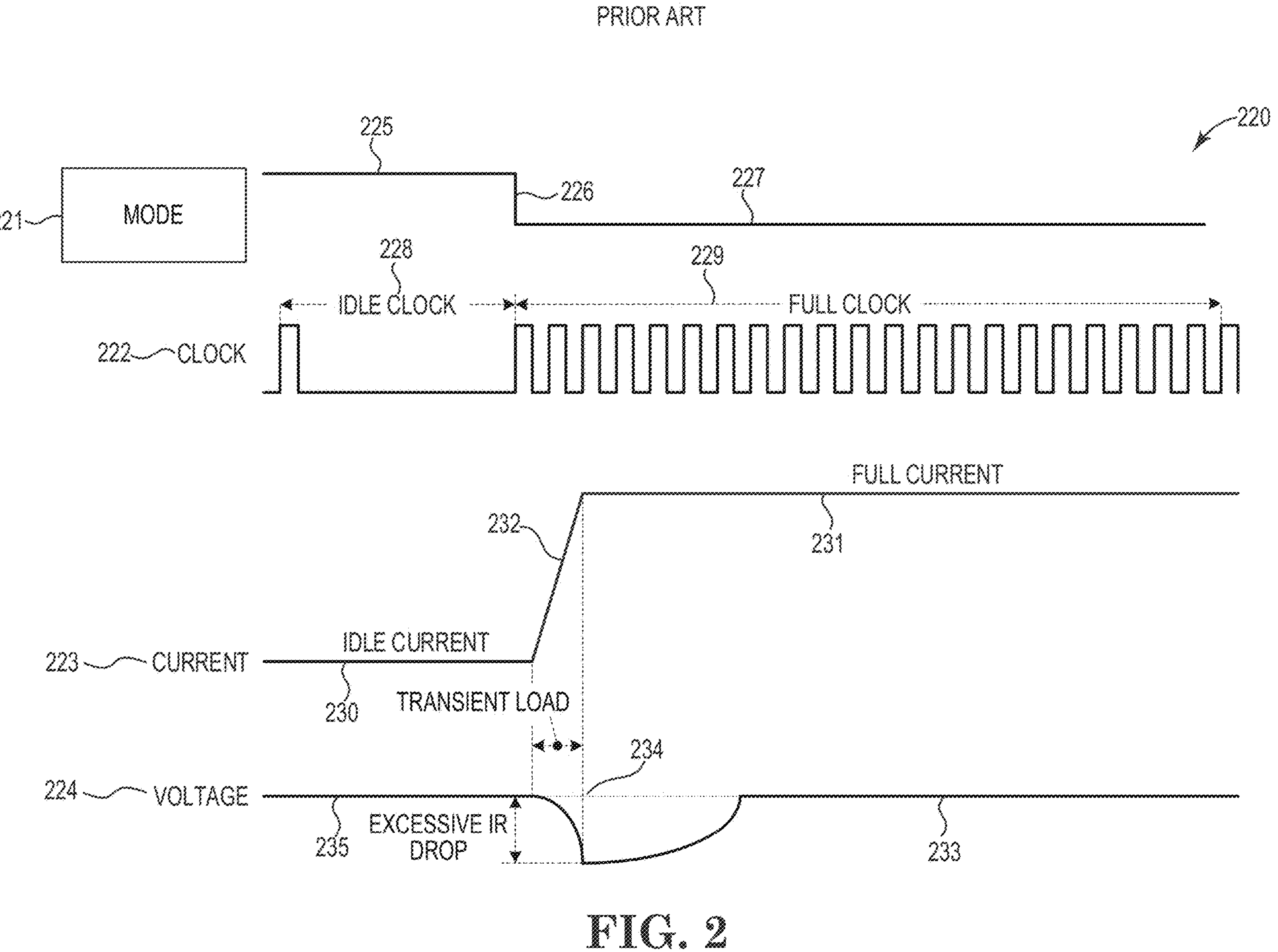
FIG. 2 illustrates a diagram of example clocking signals for clock frequency management in previous systems.

FIG. 2 illustrates a diagram 220 of example clocking signals for clock frequency management of previous systems. The diagram 220 illustrates a mode 221, clock signals 222, a current 223, and a voltage 224 of a previous system. In this way, the diagram 220 illustrates how a previous system would perform a transition from an idle mode to an operation mode and how the clock signals 222, current 223, and/or voltage 224 are affected by the transition of the mode 221.

The mode 221 can illustrate an idle mode 225 with a transition 226 to an operation mode 227. During the idle mode 225, the clock signals 222 are in an idle clock 228 and start at a full clock 229 in response to the transition 226. Although shown in FIG. 2 as square waves, the clock signals 222 can be any periodically occurring signal (e.g., saw waves, sine waves, etc.). The clock signals 222 can be generated by clock management circuitry, such as the clock management circuitry of the clock controller 104 illustrated in FIG. 1, herein.

The diagram 220 can illustrate how a transient load 232 or transitioning current 223 affects the voltage 224 in previous (existing) systems when the mode 221 transitions from the idle mode 225 to the operation mode 227. The transient load 232 is a rapid increase from the idle current 230 to full current 231 due to the transition 226 of the mode 221 from the idle mode 225 to the operation mode 227 resulting in the clock signals 222 transitioning from the idle clock 228 to the full clock 229.

In some embodiments, the voltage 224 and/or current 223 can be provided by a voltage regulator (e.g., voltage regulator 101 as referenced in FIG. 1, etc.) that includes a voltage sense feedback that utilizes a compensation loop to compensate static IR drop. As used herein, a voltage sense feedback or a voltage feedback, is a control mechanism used in electronic circuits and systems to regulate the output voltage of the voltage regulator. In some embodiments, the voltage sense feedback includes measuring the output voltage and using this information to adjust the system operation in order to maintain a particular output voltage level. Although a voltage feedback is utilized, the compensation loop is not instantaneous which results in a V-shape under/overshoot voltage response at position 234 to a step load change as illustrated by the voltage 224. That is, there is an IR drop at position 234 between the idle voltage 235 and the operation voltage 233 in response to the rapid increase of the transient load 232.

Thus, the diagram 220 illustrates that the mode 221 can include a mode transition 226 from an idle mode 225 to an operation mode 227. During the mode transition 226 the clock signals 222 can transition directly from an idle clock 228 to a full clock 229. In this diagram 220, the current 230 can include a transient load 232 between an idle current 230 and the full current 231. Furthermore, the voltage 224 can include an under/overshoot voltage response at position 234 during the transient load 232. That is, the voltage 224 illustrates an excessive IR drop during the transient load 232 caused from the mode transition 226 from the idle mode 225 to the operation mode 227.

Figure 3:
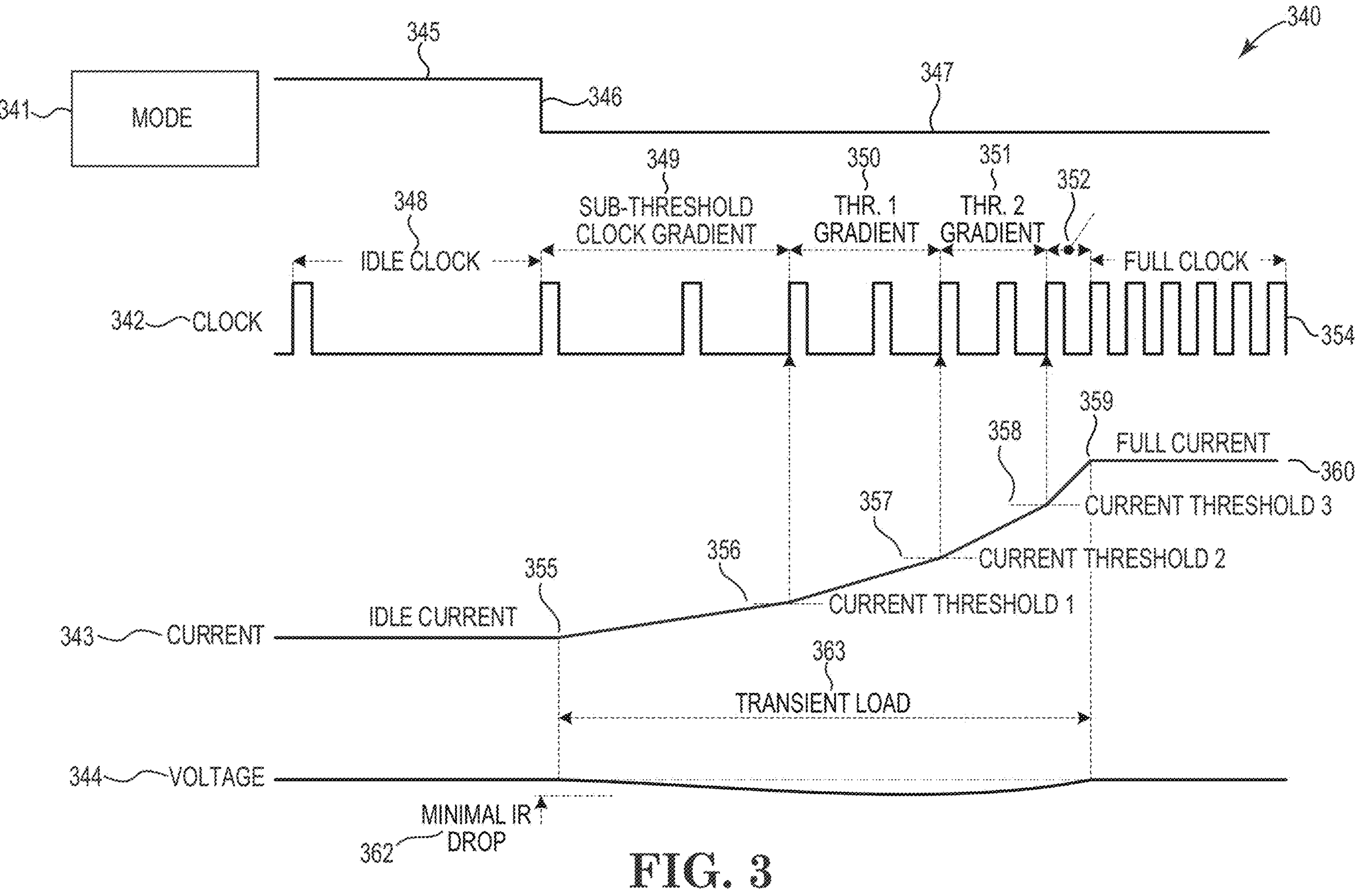
FIG. 3 illustrates a diagram of example clocking signals for current and clock frequency management in accordance with some embodiments of the present disclosure.

FIG. 3 illustrates a diagram 340 of example clocking signals for current and clock frequency management in accordance with some embodiments of the present disclosure. The diagram 340 illustrates a mode 341, clock signals 342, a current 343, and a voltage 344 of a system utilizing the current and clock frequency management described herein. In this way, the diagram 340 illustrates how a system of the present disclosure performs a mode transition 346 from an idle mode 345 to an operation mode 347 and how the clock signals 342, current 343, and/or voltage 344 are affected by the mode transition 346. Although shown in FIG. 3 as square waves, the clock signals 342 can be any periodically occurring signal (e.g., saw waves, sine waves, etc.). The clock signals 342 can be generated by clock management circuitry, such as the clock management circuitry of the clock controller 104 illustrated in FIG. 1, herein.

As described herein, the transition of the mode 341 can be identified by a mode transition 346. In some embodiments, the mode transition 346 includes a signal that the system is transitioning from the idle mode 345 to the operation mode 347. In other embodiments, the mode transition 346 can be identified based on a current or voltage transition. As described herein, the detected current can be utilized to determine a particular clocking gradient from a plurality of clocking gradients 349, 350, 351, 352. In this way, the current 343 can gradually increase from the idle current 355 to the full current 360 without an excessive IR drop (e.g., an excessive IR drop at position 234 during the transient load 232 as illustrated in FIG. 2). In some embodiments, controlling the current thresholds 356, 357, 358, 359 and the clocking gradients 349, 350, 351, 352, the most optimal transient current profile can result in a minimal IR drop 362 and over/undershoot voltages.

As described herein, the diagram 340 illustrates when a mode 341 includes a mode transition 346 from an idle mode 345 to an operation mode 347. Although diagram 340 illustrates the mode transition 346 as an idle to operation transition, other types of transitions are also possible. For example, the mode transition 346 can be from an operation mode to an idle mode. Other possible mode transitions are possible that include a transition from a first current level to a second current level. In this way, the transition from the first current level to the second current level can be more gradual compared to previous implementations to avoid an IR drop and an over/undershoot voltage while providing a clocking signals illustrated by the clock signals 342 during the transition.

The clock signals 342 can include idle clocking signals 348. In these embodiments, the idle clocking signals 348 may not include a frequency of clocking signals to conserve electricity during an idle mode of operation. In some embodiments, the clock signals 342 can include a sub-threshold clock gradient 349 for a sub-threshold current 356. In some embodiments, the sub-threshold clock gradient 349 can be a frequency of clocking signals that are generated when the detected current level is within the sub-threshold current 356. In some embodiments, the sub-threshold current 356 can be a range of currents that can be defined based on factors that affect the IR drop of the system. In some embodiments, the clock signals 342 can include a first threshold clock gradient 350 for a first threshold current 357. The first threshold clock gradient 350 can be a frequency of clocking signals that are generated when the detected current level is within the first threshold current 357 or between the sub-threshold current 356 and the first threshold current 357. In some embodiments, the first threshold current 357 can be a range of currents that can be defined based on factors that affect the IR drop of the system.

In some embodiments, the clock signals 342 can include a second threshold clock gradient 351 for a second threshold current 358. The second threshold clock gradient 351 can be a frequency of clocking signals that are generated when the detected current level is within the second threshold current 358 or between the first threshold current 357 and the second threshold current 358. In some embodiments, the second threshold current 358 can be a range of currents that can be defined based on factors that affect the IR drop of the system. In some embodiments, the clock signals 342 can include a third threshold clock gradient 352 for a third threshold current 359. The third threshold clock gradient 352 can be a frequency of clocking signals that are generated when the detected current level is within the third threshold current 359 or between the second threshold current 358 and the third threshold current 359. In some embodiments, the third threshold current 359 can be a range of currents that can be defined based on factors that affect the IR drop of the system.

In some embodiments, the clock signals 342 can include a full clock 354 for a full current 360. The full clock 354 can be a frequency of clocking signals that are generated when the detected current level is at the full current 360 and/or a current level that is at or greater than the third threshold current 359. In some embodiments, the full current 360 can be an operational current of the system when the system is operating at a normal mode or operation mode.

The diagram 340 illustrates that the voltage 344 is less affected by the IR drop 362 during the transient load 363 or transition of the current from an idle current 355 to the full current 360 through the plurality of threshold currents 356, 357, 358, 359. In this way, the current 343 can be gradually increased from the idle current 355 to the full current 360 to lower the IR drop 362 of the voltage 344. During the gradual increase of the current 343, the clock signals 342 can be generated according to the plurality of clock gradients 349, 350, 351, 352 that correspond to the plurality of threshold currents 356, 357, 358, 359. In this way, the frequency of the clock signals 342 can be determined based on which of the plurality of threshold currents 356, 357, 358, 359 a detected current is within. Thus, a current can be detected to determine a particular current threshold and corresponding clocking gradient with a corresponding clocking frequency.

Figure 4:
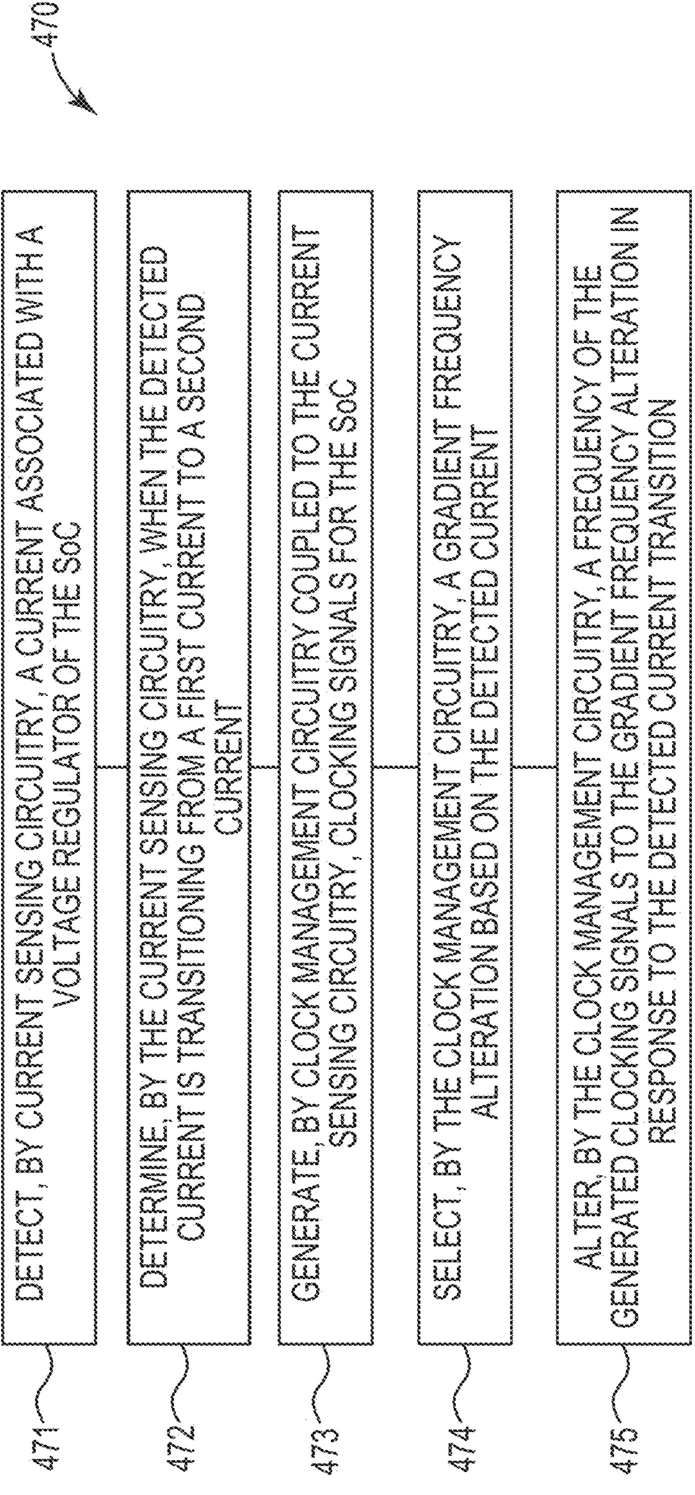
FIG. 4 is a flow diagram corresponding to a method for current and clock frequency management in accordance with some embodiments of the present disclosure.

FIG. 4 is a flow diagram corresponding to a method 470 for current and clock frequency management in accordance with some embodiments of the present disclosure. The method 470 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 470 is performed by one or more components of the system 100 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 471, the method 470 can include detecting, by current sensing circuitry a current associated with a voltage regulator of the SoC. As described herein, the current sensing circuitry or current sensor can be connected to a voltage regulator or power supply to determine an instantaneous or near-instantaneous current drawn by the system. In some embodiments, the current sensor is coupled to switching circuitry that can allow the current sensor to determine a current passing through a particular switch or set of switches. In this way, the current sensing circuitry can be utilized to detect current changes of the system and provide the instantaneous current level to clock management circuitry.

At operation 472, the method 470 can include determining, by the current sensing circuitry, when the detected current is transitioning from a first current to a second current. In some embodiments, transitioning from a first current to a second current can be an indication that the device or apparatus is altering from a first mode or state to a second mode or state. For example, the transitioning from the first current to the second current can be a transitioning from an idle current to an operation current that can indicate the system is transitioning from an idle mode to an operation mode.

In other embodiments, transitioning from the first current to the second current can be a transition from a first current level that is within a first current range and the second current can be a second current level that is within a second current range. In this way, the transition from the first current to the second current can be a transition from a first current threshold to a second current threshold. In this way, the transition can correspond to a transition from a first current gradient frequency alteration that corresponds to the first current threshold to a second current gradient frequency alteration that corresponds to the second current threshold.

At operation 473, the method 470 can include generating, by clock management circuitry coupled to the current sensing circuitry, clocking signals for the SoC. As described herein, the clock management circuitry or clock controller can be communicatively coupled to the current sensing circuitry such that the current sensing circuitry can send communication signals to the clock management circuitry. In this way, the clock management circuitry can receive communication signals from the current sensing circuitry. For example, the current sensing circuitry can determine or detect a current of the SoC in real time and provide the real time current to the clock management circuitry. In this way, the clock management circuitry can receive a real time current level of the SoC.

At operation 474, the method 470 can include selecting, by the clock management circuitry, a gradient frequency alteration based on the detected current. As described herein, the clock management circuitry can receive the detected current from the current sensing circuitry and utilize the detected current to select a gradient frequency alteration. As described herein, the gradient frequency alteration includes a particular frequency for clocking signals generated by the clock management circuitry. The gradient frequency alteration can have a corresponding range of current levels. In this way, the detected current level can be utilized to determine what range of current levels the detected current is within and select the corresponding frequency alteration.

At operation 475, the method 470 can include altering, by the clock management circuitry, a frequency of the generated clocking signals to the gradient frequency alteration in response to the detected current transition. Upon selecting the gradient frequency alteration, the generated clocking signals can be altered to the frequency identified by the gradient frequency alteration.

In some embodiments, the method 470 can include determining initiation of a low-power mode (e.g., a retention mode utilizing a minimum current for retention of data etc.) of the SoC, detecting, by the current sensing circuitry, the current associated with the voltage regulator of the SoC is transitioning to a lower current in response to the initiation of the low-power mode, and altering, by the clock management circuitry, the frequency to a corresponding lower frequency based on the gradient frequency alteration that corresponds to the lower current. As described herein, the current associated with the voltage regulator can be increasing when the system is transitioning from an idle mode to an operation mode and the current can be decreasing when the system is transitioning from the operation mode to the idle mode. When the detected current level exceeds a threshold current level, a corresponding gradient frequency alteration can be selected and the frequency of the clocking signals can be altered to the selected gradient frequency alteration.

In some embodiments, the method 470 can include determining an early termination of the idle mode of the SoC, detecting, by the current sensing circuitry, the current associated with the SoC is transitioning to a higher current in response to the termination of the idle mode, and altering, by the clock management circuitry, the frequency to a corresponding higher frequency based on the gradient frequency alteration that corresponds to the higher current. As described herein, an early termination of the idle mode can be an early termination of a transition from an operation mode to the idle mode. In these embodiments, the current of the SoC will decrease during the idle mode transition and in response to the early termination of the idle mode, the current of the SoC will increase. In this way, the clock management circuitry can dynamically adjust the frequency of the clocking signals in response to altering current and prevent over/undershoots as described herein.

In some embodiments, the method 470 can include generating, by the clock management circuitry, the clock signals at the frequency identified by the gradient frequency alteration based on the detected current value. As described herein, the detected current value can correspond to a range of current values associated with a particular gradient frequency alteration. In these embodiments, the gradient frequency alteration can be associated with a particular frequency of clocking signals that can be utilized while the current is within the range of current values.

In some embodiments, the method 470 can include generating, by the clock management circuitry, the clock signals in the absence of a predicted current or a predicted voltage associated with the SoC. Since the clock management circuitry is receiving a detected current in real time, the predicted current and/or predicted voltage of the SoC is not necessary to predict frequency changes to the clocking signals. In this way, the predicted current and/or predicted voltage are not utilized to adjust the frequency of the clocking signals.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:

a voltage regulator;

current sensing circuitry configured to:

detect a current associated with the voltage regulator of a system-on-chip (SoC); and determine when the current transitions from a first current to a second current, wherein the current transition indicates a mode transition of the SoC from an idle mode to an operation mode; and clock management circuitry configured to:

generate clocking signals for the SoC;

select a gradient frequency alteration based on the detected current and the mode transition, wherein the gradient frequency alteration consists of a plurality of frequency alterations for the mode transition from the idle mode to the operation mode; and alter a frequency of the generated clocking signals to the gradient frequency alteration in response to the detected current transition.

2. The apparatus of claim 1, wherein the clock management circuitry is configured to alter the frequency of the clocking signals by decreasing the frequency of the clocking signals according to the gradient frequency alteration.

3. The apparatus of claim 1, wherein the clock management circuitry is further configured to alter the frequency of the clocking signals by increasing the frequency of the clocking signals according to the gradient frequency alteration.

4. The apparatus of claim 1, wherein the current transition from the first current to the second current includes a current transition of the SoC from a first state to a second state.

5. The apparatus of claim 4, wherein a plurality of gradient frequency alterations are selectable between the first state and the second state.

6. The apparatus of claim 1, wherein the gradient frequency includes a specific clock frequency to be utilized during a specific range of current values.

7. The apparatus of claim 1, wherein the clock management circuitry is further configured to apply a power mode transition termination during a power mode transition.

8. The apparatus of claim 1, wherein the current sensing circuitry is further configured to detect a transient current at the voltage regulator.

9. The apparatus of claim 1, wherein the voltage regulator includes a voltage sense feedback to compensate a current-resistance drop.

10. A method, comprising:

detecting, by current sensing circuitry, a current associated with a voltage regulator of a system-on-chip (SoC);

determining, by the current sensing circuitry, when the detected current is transitioning from a first current to a second current, wherein the transitioning indicates a mode transition of the SoC from an idle mode to an operation mode;

generating, by clock management circuitry coupled to the current sensing circuitry, clocking signals for the SoC;

selecting, by the clock management circuitry, a gradient frequency alteration based on the detected current and the mode transition, wherein the gradient frequency alteration consists of a plurality of frequency alterations for the mode transition from the idle mode to the operation mode; and altering, by the clock management circuitry, a frequency of the generated clocking signals to the gradient frequency alteration in response to the detected current transition.

11. The method of claim 10, further comprising:

determining initiation of a low-power mode of the SoC;

detecting, by the current sensing circuitry, the current associated with the voltage regulator of the SoC is transitioning to a lower current in response to the initiation of the low-power mode; and altering, by the clock management circuitry, the frequency to a corresponding lower frequency based on the gradient frequency alteration that corresponds to the lower current.

12. The method of claim 11, further comprising:

determining an early termination of the low-power mode of the SoC;

detecting, by the current sensing circuitry, the current associated with the SoC is transitioning to a higher current in response to the termination of the low-power mode; and altering, by the clock management circuitry, the frequency to a corresponding higher frequency based on the gradient frequency alteration that corresponds to the higher current.

13. The method of claim 10, further comprising generating, by the clock management circuitry, the clock signals at the frequency identified by the gradient frequency alteration based on the detected current.

14. The method of claim 13, further comprising, generating, by the clock management circuitry, the clock signals in the absence of a predicted current or a predicted voltage associated with the SoC.

15. A system, comprising:

a plurality of computing components coupled to a system-on-chip (SoC), wherein the SoC comprises:

a voltage regulator;

a current sensing circuit configured to:

detect a current associated with the voltage regulator of the SoC; and determine when the current transitions from a first current to a second current, wherein the current transition indicates a mode transition of the SoC from an idle mode to an operation mode; and clock management circuitry configured to:

generate clocking signals for the SoC;

select a gradient frequency alteration based on the current and the mode transition, wherein the gradient frequency alteration consists of a plurality of frequency alterations for the mode transition from the idle mode to the operation mode;

alter a frequency of the generated clocking signals to the gradient frequency alteration in response to the detected current transition; and apply the clocking signals having the altered frequency to one or more of the plurality of computing components or to one or more components of the SoC.

16. The system of claim 15, wherein the voltage regulator is a Low Dropout Regulator (LDO).

17. The system of claim 16, wherein the current sensing circuit is a current mirror in the LDO.

18. The system of claim 15, wherein the plurality of frequency alterations are selected to minimize a current drop of the SoC during the mode transition.

19. The system of claim 15, wherein the current sensing circuit is a current transformer in a switching supply.

20. The system of claim 15, wherein the current sensing circuit is connected to the voltage regulator to determine an instantaneous or near-instantaneous current drawn by the SoC.

* * * * *